United States Patent
Yamazaki

(10) Patent No.: US 8,955,954 B2
(45) Date of Patent: Feb. 17, 2015

(54) PIGMENT INK, INK JET RECORDING APPARATUS, AND INK JET RECORDING METHOD

(75) Inventor: Soichi Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 147 days.

(21) Appl. No.: 13/336,097

(22) Filed: Dec. 23, 2011

(65) Prior Publication Data

US 2012/0162307 A1 Jun. 28, 2012

(30) Foreign Application Priority Data

Dec. 24, 2010 (JP) ................. 2010-288213
Dec. 24, 2010 (JP) ................. 2010-288657

(51) Int. Cl.
*B41J 2/01* (2006.01)
*C09D 11/38* (2014.01)
*B41J 2/21* (2006.01)
*C09D 11/322* (2014.01)

(52) U.S. Cl.
CPC . *C09D 11/38* (2013.01); *B41J 2/01* (2013.01); *B41J 2/2107* (2013.01); *C09D 11/322* (2013.01)
USPC .............................. 347/100; 347/95; 347/101

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ............ 347/100, 95, 96, 101, 102, 20, 21, 9, 347/105, 103, 88, 99; 106/31.6, 31.27, 106/31.13; 523/160, 161

See application file for complete search history.

(56) References Cited

U.S. PATENT DOCUMENTS

| | | | |
|---|---|---|---|
| 5,637,140 A | 6/1997 | Fujioka | |
| 6,031,019 A * | 2/2000 | Tsutsumi et al. | 523/160 |
| 2002/0085048 A1* | 7/2002 | Ishinaga et al. | 347/96 |
| 2003/0019392 A1* | 1/2003 | Wakabayashi et al. | 106/31.27 |
| 2003/0203987 A1* | 10/2003 | Nomoto et al. | 523/160 |
| 2003/0222961 A1* | 12/2003 | Nakajima | 347/102 |
| 2004/0055507 A1 | 3/2004 | Uhlir-Tsang et al. | |
| 2004/0119801 A1* | 6/2004 | Suzuki et al. | 347/100 |
| 2004/0252169 A1* | 12/2004 | Chen et al. | 347/96 |
| 2008/0106574 A1* | 5/2008 | Imahashi et al. | 347/47 |
| 2008/0233363 A1* | 9/2008 | Goto | 428/195.1 |
| 2009/0233059 A1* | 9/2009 | Ota et al. | 428/195.1 |

FOREIGN PATENT DOCUMENTS

| | | |
|---|---|---|
| JP | 06-157959 A | 6/1994 |
| JP | 08-157761 A | 6/1996 |
| JP | 09-003374 A | 1/1997 |
| JP | 2001-302953 A | 10/2001 |
| JP | 2003-305872 A | 10/2003 |
| JP | 2004-115803 A | 4/2004 |
| JP | 2008-001003 A | 1/2008 |

* cited by examiner

*Primary Examiner* — Manish S Shah
(74) *Attorney, Agent, or Firm* — Nutter McClennen & Fish LLP; John J. Penny, Jr.; Taylor M. Coon

(57) ABSTRACT

A pigment ink includes an acetylene glycol or 2-ethyl-1,3-hexanediol, and an unsaturated fatty acid, an amino acid, an alkali metal hydroxide and an amine.

9 Claims, 3 Drawing Sheets

PIGMENT INK, INK JET RECORDING APPARATUS, AND INK JET RECORDING METHOD

The entire disclosure of Japanese Application No.: 2010-288657 filed on Dec. 24, 2010 and 2010-288213 filed on Dec. 24, 2010 are expressly incorporated by reference herein.

BACKGROUND

1. Technical Field

The present invention relates to a pigment ink, an ink jet recording apparatus and an ink jet recording method.

2. Related Art

There has been a demand for ink jet recording inks that can form images more quickly and with higher quality.

For example, JP-A-2008-1003 discloses an ink jet image recording method in which the static surface tension of an ink to be ejected and the dynamic surface tension (a surface tension that works for a very short time) of the ejected ink during the formation of an ink droplet are controlled within specific ranges in order to ensure ink ejection stability even at high-speed output as well as to reduce the occurrence of satellite droplets during ink ejection and to prevent degradation of images.

However, the recording method of JP-A-2008-1003 cannot completely suppress satellite droplet formation. Thus, there remains a demand for inks, ink jet recording apparatuses and ink jet recording methods that allow for stable image formation with higher speed and higher quality.

SUMMARY

Advantages of some aspects of the invention are that a pigment ink is provided which can suppress satellite droplet formation and can produce high-quality images at high speed, and that an ink jet recording apparatus and an ink jet recording method using the pigment ink are provided.

The inventors of the invention first studied in detail the mechanism of satellite droplet formation.

A surfactant dissolved in water decreases the surface tension of water and facilitates for water to form a film and finally a large soap bubble. A similar mechanism is considered to apply to the formation of tail (string) of an ink that is ejected by an ink jet system. When an ink has a low surface tension, ejecting the ink results in a long-tailed droplet which breaks into two or more droplets including the main droplet and the satellite droplet(s) during the fly of the ink. These droplets land on a recording medium such as paper, forming an irregular image. Thus, the inventors have found the relationship that satellite droplets are more likely when the surface tension of an ink is low.

The inventors further studied the cause for satellite droplets in the recording method disclosed in JP-A-2008-1003.

In the recording method, a high surface tension of an ink is adopted in order to suppress satellite droplet formation. This is a possible approach for suppressing satellite droplet formation in conformity with the aforementioned finding. However, an ink with an increased surface tension shows poor penetration into a recording medium. Because of the poor penetration properties, the wet ink remains on the recording medium. As a result, it is likely that the ink will adhere to medium transport rollers (paper transport rollers) of a recording apparatus or will cause defective images such as bleeding, or that the print will attach to hands.

Thus, the inventors have found that the cause for satellite droplet formation in the recording method of JP-A-2008-1003 lies in that the method simply adopts a high surface tension of an ink but does not address the associated problems.

The inventors then carried out studies to solve the problems that are encountered by increasing the surface tension of an ink.

Factors for satellite droplet formation other than the ink surface tension include, for example, the viscosity of an ink. Adding sugar to soapy water increases the liquid viscosity (film strength) and the resultant liquid can form a larger soap bubble. Highly viscous liquids such as honey and adhesives are slow in movement and extend to a great length. A similar mechanism probably applies to the tail formation of an ink that is ejected by an ink jet system. Similarly to when an ink has a low surface tension, a droplet of a highly viscous ink has a long tail which breaks into two or more droplets during the fly of the ink, resulting in an irregular image.

Thus, the inventors have found that satellite droplets are also likely to occur when the ink has a high viscosity.

A possible approach in consideration of the above finding is to lower the ink viscosity. However, lowering the ink viscosity in order to suppress satellite droplet formation is more difficult as the ink has higher functions because such an ink contains large amounts of various additives. In particular, downsizing the ink droplets for greater image quality involves a higher colorant concentration and a relatively decreased water content, resulting in a high ink viscosity. Further, a high ink viscosity is inevitable when the water content is restricted in order to achieve quick drying properties or to suppress curls.

According to the finding by the inventors described above, it is difficult to suppress the occurrence of satellite droplets while realizing excellent functions of an ink because such functions are achieved by the addition of various additives in large amounts which increases the ink viscosity, resulting in satellite droplet formation.

High speed recording is another factor that increases the probability of satellite droplet formation. By the term "high speed recording" is meant that an ink is ejected to a recording medium while at least one of an ink jet head and the recording medium is moved and the relative movement speed is high (relative speed: 0.5 m/s or more). If a satellite droplet is formed when an ink is ejected in the high speed recording, the main droplet and the satellite droplet land (fall) on locations which are so different from each other that the satellite is noticeable on the resultant image. Even if a satellite occurs in low speed printing in which the relative movement speed is low (relative speed: less than 0.5 m/s), the main droplet and the satellite droplet will land on substantially the same location. Thus, satellite droplet formation is not a particular problem in low speed recording (because the satellite droplets are inconspicuous on the image). However, inaccurate landing of an ink in the high speed recording, in particular satellite droplet formation, is a serious problem since it is highly noticeable on the print.

According to the finding by the inventors described above, a known ink is likely to cause satellite droplets, in particular when recording is performed at high speed, and the low landing accuracy inevitably results in degraded image quality.

The inventors conducted further studies based on the aforementioned findings. They have then found that the above-described problems are solved with a pigment ink that contains specific components as surfactants and pH adjusters, thus completing the invention.

Some aspects of the invention are as follows.

1. A pigment ink including an acetylene glycol or 2-ethyl-1,3-hexanediol, and an unsaturated fatty acid, an amino acid, an alkali metal hydroxide and an amine.

2. The pigment ink described in 1, wherein the unsaturated fatty acid includes oleic acid.

3. The pigment ink described in 1, wherein the amino acid includes at least one of trimethylglycine and dimethylglycine.

4. The pigment ink described in 1, wherein the alkali metal hydroxide includes one or more selected from the group consisting of potassium hydroxide (KOH), sodium hydroxide (NaOH) and lithium hydroxide (LiOH).

5. The pigment ink described in 1, wherein the amine includes at least one of triethanolamine and tripropanolamine.

6. The pigment ink described in 1, which contains an acid-base salt formed between at least one of the unsaturated fatty acid and the amino acid, and at least one of the alkali metal hydroxide and the amine.

7. The pigment ink described in 6, wherein the acid-base salt is one or more selected from the group consisting of potassium oleate, tripropanolamine oleate, triethanolamine oleate and amino acid potassium salt.

8. An ink jet recording apparatus including an ink jet head which ejects the pigment ink described in any one of 1 to 7 while moving at a relative speed of not less than 0.5 m/s relative to a recording medium.

9. An ink jet recording method including ejecting the pigment ink described in any one of 1 to 7 from an ink jet head which moves at a relative speed of not less than 0.5 m/s relative to a recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
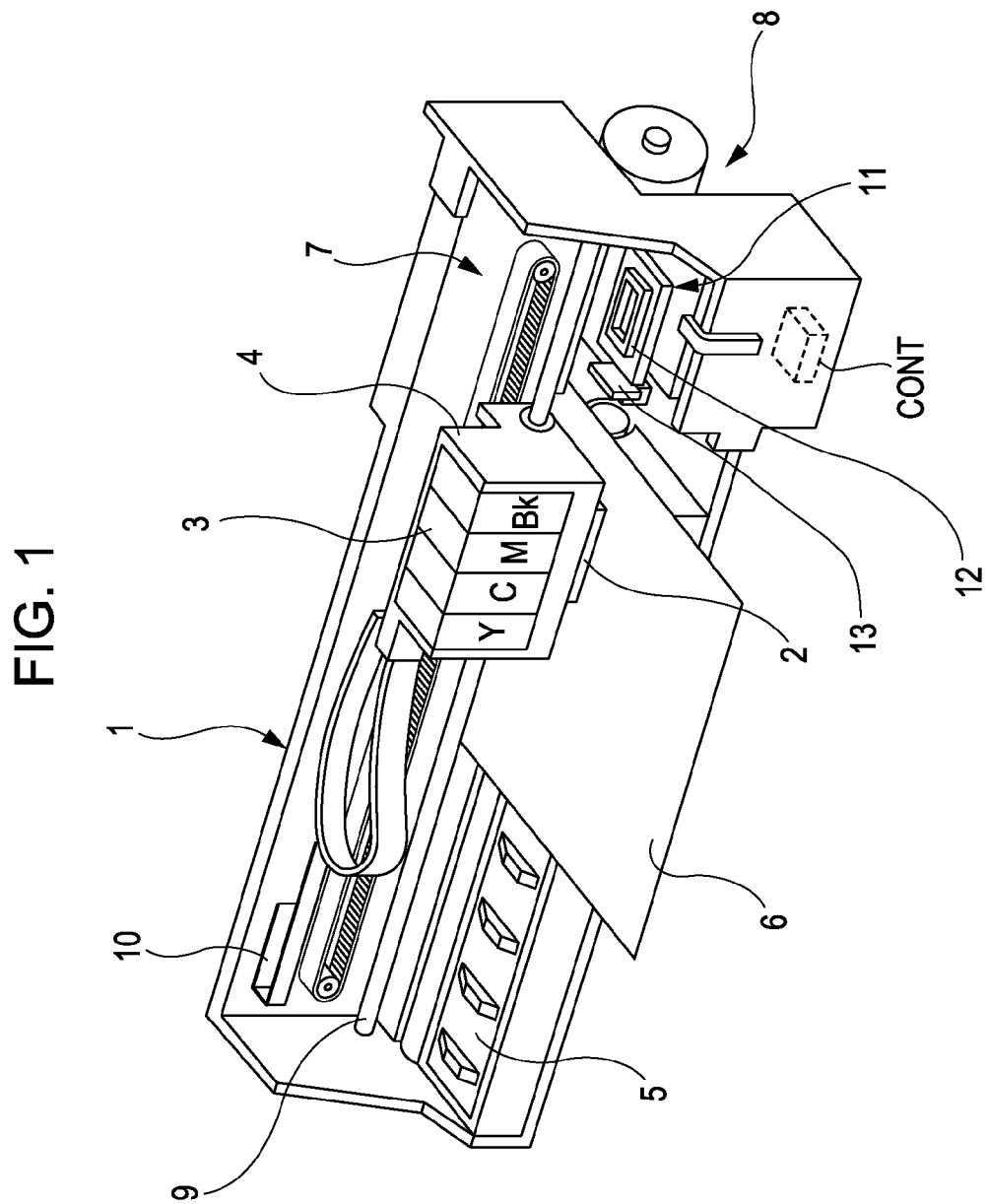
FIG. 1 is a perspective view illustrating a structure of a printer according to an embodiment of the invention.

Embodiments for carrying out the invention will be described in detail below. The invention is not limited to those embodiments, and various modifications are possible within the scope of the invention.

As used in the specification, the term "ejection stability" refers to a property that ink droplets are ejected from a nozzle continuously and stably without clogging the nozzle. Term "attacking characteristics" refers to characteristics of an ink relating to phenomena such as dissolution, swelling, breakage and surface roughening of materials forming components of a recording apparatus such as a recording head and an ink channel.

Pigment Inks

A pigment ink according to an embodiment of the invention includes an acetylene glycol or 2-ethyl-1,3-hexanediol, and an unsaturated fatty acid, as well as an amino acid, an amine and an alkali metal hydroxide.

The reasons why it is important for the pigment ink in this embodiment to contain the above five essential components will be described below.

The acetylene glycol or 2-ethyl-1,3-hexanediol is a surfactant which is unlikely to foam and has excellent affinity (wetting properties). However, even the use of an anti-foaming acetylene glycol or 2-ethyl-1,3-hexanediol does not reduce the tail length of the ejected ink droplets to such an extent that satellite droplets are not formed.

The first purpose of using the unsaturated fatty acid is to solve this problem associated with the acetylene glycol or 2-ethyl-1,3-hexanediol. The unsaturated fatty acid is greatly different from the acetylene glycol or 2-ethyl-1,3-hexanediol in terms of molecular structure. The combined use of the acetylene glycol or 2-ethyl-1,3-hexanediol and the unsaturated fatty acid as surfactants decreases the ink film strength probably because the steric hindrance due to the greatly differing structures disturbs the arrangement of the surfactant molecules on the surface of the ejected ink. Since the tail of an ink droplet is attributed to high film strength, the ejected ink droplets in this embodiment will have so short a tail that the occurrence of satellite droplets will be markedly suppressed.

The second purpose of using the unsaturated fatty acid is to adjust pH in combination with the amino acid, the amine and the alkali metal hydroxide. The unsaturated fatty acid is unstable and is readily oxidized. The four acid and alkali components including the unstable unsaturated fatty acid buffer the pH to permit the pigment ink to have good long-term stability, namely, to suppress the occurrence of satellite droplets over the long term.

As described above, the amino acid, the amine and the alkali metal hydroxide as well as the unsaturated fatty acid are acid and alkali components having pH buffer effects.

Hereinbelow, components that are or may be contained in the pigment ink will be described.

Pigments

The pigment ink in this embodiment contains a pigment as a colorant. The pigments are not particularly limited. Examples thereof include C. I. pigment yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C. I. pigment red 1, 3, 5, 8, 9, 16, 17, 19, 22, 38, 57:1, 90, 112, 122, 123, 127, 146, 184, 202 and 209, C. I. pigment violet 1, 3, 5:1, 16, 19, 23 and 38, C. I. pigment blue 1, 2, 15, 15:1, 15:2, 15:3, 15:4 and 16, and C. I. pigment black 1 and 7.

In a preferred embodiment, the pigment is a self-dispersible pigment in which a dispersibility-imparting group (at least one of a hydrophilic functional group and a salt thereof) is bonded on the pigment surface directly or indirectly via a group such as an alkyl, alkyl ether or aryl group and thereby the pigment can be dispersed or dissolved in an aqueous medium without dispersants. Such a self-dispersible pigment is preferably mixed into the pigment ink as a pigment dispersion in which the pigment is dispersed in an aqueous medium with or without a dispersant. Exemplary dispersants include styrene-acrylic acid copolymer resins. The molecular weight of the dispersants is preferably about 10,000 to 150,000 in order that the pigment be stably dispersed.

For example, Cabot Corporation offers two types of self-dispersible black pigments, CAB-O-JET 200 (product name, sulfonated carbon black) and CAB-O-JET 300 (product name, carboxylated carbon black). Commercial self-dispersible black pigments further include Bonjet Black CW-1 (product name, manufactured by ORIENT CHEMICAL INDUSTRIES CO., LTD.).

In order to achieve good storage stability of the ink and to effectively prevent the clogging of nozzles, the pigment preferably has an average particle diameter in the range of 50 to 250 nm. As used herein, the term "average particle diameter" is an equivalent spherical 50% average particle diameter (d50) which is determined by a dynamic light scattering method as follows.

Light is applied to the particles in a dispersion medium, and the intensity of the diffracted and scattered light is measured with detectors that are located on the front, sides and back of the dispersion medium. The irregularly shaped particles are assumed to be spherical particles having a volume equal to that of the measured particles, and an accumulation curve is obtained in which the volumes of the equivalent spherical particles amount to 100% based on the obtained data. The diameter that corresponds to 50% of the accumulated distribution is obtained as the "equivalent spherical 50% average particle diameter (d50) according to the dynamic light scattering method". For example, laser diffraction scattering particle size distribution analyzer LMS-2000e (product name, manufactured by SEISHIN ENTERPRISE Co., Ltd.) may be used in the determination of the diffracted and scattered light intensity.

Preferably, the pigment is contained at 2 to 15% by mass with respect to the total mass (100% by mass) of the pigment ink in this embodiment. When the content is 2% by mass or above, the print density is sufficient and excellent color properties are obtained. When the content is not more than 15% by mass, the clogging of nozzles is prevented and excellent ejection stability is obtained.

Acetylene Glycols

The pigment ink in this embodiment may contain an acetylene glycol. Acetylene glycols are nonionic surfactants having a symmetric structure with the acetylene group at the center. They are used as anti-foaming wetting agents in various aqueous materials. Acetylene glycols have excellent characteristics such as wetting, anti-foaming and dispersing characteristics. The glycols are very stable in terms of molecular structure, and have a low molecular weight and reduce the surface tension of water. Thus, the penetration and the bleeding of the ink into/on the recording medium can be controlled appropriately.

Specific examples of the acetylene glycols include 2,4,7,9-tetramethyl-5-decyne-4,7-diol, 3,6-dimethyl-4-octyne-3,6-diol and 3,5-dimethyl-1-hexyne-3-ol. The acetylene glycol may be an alkylene oxide adduct.

Commercial acetylene glycols include Surfynol 104 (series), 420, 440, 465 and 485 (product names, manufactured by Air Products and Chemicals. Inc.), Olfine STG, PD-001, SPC, E1004 and E1010 (product names, manufactured by Nissin Chemical Industry Co., Ltd.), and Acetylenol E00, E40, E100 and LH (product names, manufactured by Kawaken Fine Chemicals Co., Ltd.).

The acetylene glycols may be used singly, or two or more may be used in combination.

The content of the acetylene glycol is preferably 0.1 to 3.0% by mass, and more preferably 0.3 to 2.0% by mass with respect to the total mass (100% by mass) of the pigment ink. This content ensures good gloss and penetration properties.

2-Ethyl-1,3-hexanediol

The pigment ink in this embodiment may contain 2-ethyl-1,3-hexanediol. 2-Ethyl-1,3-hexanediol is a nonionic surfactant having a structure with the two hydroxyl groups at substantially the center of the molecule. This compound is known as an anti-foaming wetting agent. 2-Ethyl-1,3-hexanediol has a low molecular weight, is very stable in terms of molecular structure, and reduces the surface tension of water. Thus, the penetration and the bleeding of the ink into/on the recording medium can be controlled appropriately.

The content of 2-ethyl-1,3-hexanediol is preferably 0.3 to 8% by mass, and more preferably 1 to 5% by mass with respect to the total mass (100% by mass) of the pigment ink. This content ensures excellent penetration properties and effective prevention of bleeding.

Unsaturated Fatty Acids

The pigment ink in this embodiment contains an unsaturated fatty acid. The functions of the unsaturated fatty acid will be described below.

In the pigment ink in this embodiment, the combined use of the acetylene glycol or 2-ethyl-1,3-hexanediol and the unsaturated fatty acid has been found to produce the following effects. The pigment ink in this embodiment contains the acetylene glycol-based surfactant or 2-ethyl-1,3-hexanediol and the unsaturated fatty acid-based surfactant. The acetylene glycol or 2-ethyl-1,3-hexanediol is a low-molecular weight surfactant having a three-dimensional structure. Accordingly, they are inherently anti-foaming surfactants excellent in wetting properties. Oleic acid is a linear unsaturated fatty acid that is a highly foaming surfactant used in soaps. The inventors of the invention have found that a combination of these two compounds has markedly reduced foaming properties compared to the individual compounds.

The combined use thus results in the shortening of the tail length of the ejected ink droplets and reduces the occurrence of satellite droplets. The reason for this is probably that the combined use of the acetylene glycol or 2-ethyl-1,3-hexanediol and the unsaturated fatty acid surfactant which greatly differs from the acetylene glycol or 2-ethyl-1,3-hexanediol in terms of molecular structure decreases the ink film strength because of the steric hindrance which disturbs the arrangement of the surfactant molecules on the surface of the ejected ink.

The pigment ink in this embodiment contains pH adjusters that are four kinds of acids and alkalis including the unsaturated fatty acid described above, and the amino acid, the alkali metal hydroxide and the amine described later. In general, many combinations of an acid and an alkali are known to have pH buffering effects. The pigment ink in the invention contains four kinds of pH adjusters having respective functions. The pH adjustment range is preferably from pH 6 to pH 10 in order to effectively suppress attacking properties of the ink with respect to constituent materials of an ink jet recording apparatus and to ensure clogging recovery.

The unsaturated fatty acid that is one of the four pH adjusters functions as a surfactant, a lubricant and a penetrating agent in addition to functioning as a buffering acid. As described above, oleic acid is a preferred unsaturated fatty acid.

The combination of the four pH adjusters in this embodiment can stably buffer pH over the long term while sufficiently achieving the additional respective functions. Thus, this combined use has been found to produce excellent synergistic effects.

Of the unsaturated fatty acids, an unsaturated fatty acid that has one double bond is preferable. Exemplary monounsaturated fatty acids include crotonic acid, myristoleic acid, palmitoleic acid, oleic acid, elaidic acid, vaccenic acid, gadoleic acid, eicosenoic acid, erucic acid and nervonic acid. If two or more double bonds are present, the methylene hydrogen present between the double bonds is abstracted and the acid is readily oxidized. This is the case with linoleic acid and linolenic acid. Unsaturated fatty acids with one double bond are free of such methylene hydrogen and are less prone to oxidation.

The pigment ink is preferably liquid. Many of the saturated fatty acids that are stable against oxidation are solid at ordinary temperature and are thus not suited for use in inks. Oleic acid satisfies all of these characteristics.

For the reasons described above, the unsaturated fatty acid is preferably oleic acid.

A purified unsaturated fatty acid may be used. A plant oil such as olive oil based on oleic acid may be used.

The unsaturated fatty acids may be used singly, or two or more may be used in combination.

The content of the unsaturated fatty acid is preferably 0.05 to 3% by mass, and more preferably 0.1 to 1% by mass with respect to the total mass (100% by mass) of the pigment ink. This content ensures an excellent balance between the functions of a surfactant and a pH adjuster (on the acidic side).

Amino Acids

The pigment ink in this embodiment contains an amino acid.

The amino acid, which is one of the four pH adjusters in the invention, has excellent pH buffering functions with both the amino and carboxyl functional groups. In addition, it works as a moisturizing agent or a curl inhibitor which inhibits the curling of recording media.

Preferred amino acids are tertiary or quaternary amino acids that are chemically stable. In particular, at least one of dimethylglycine and trimethylglycine is preferably used because of their low molecular weight.

The amino acids may be used singly, or two or more may be used in combination.

The content of the amino acid is preferably 1 to 30% by mass, and more preferably 4 to 20% by mass with respect to the total mass (100% by mass) of the pigment ink. This content ensures that the amino acid functions as a moisturizer and a curl inhibitor and shows excellent pH adjusting functions as an acid/base amphoteric electrolyte.

Amines

The pigment ink in this embodiment contains an amine.

The amine, which is one of the four pH adjusters in the invention, is a weak alkali used in products such as shampoos and cosmetics that is not toxic to humans. It works as a weak alkaline adjuster. An amphiphilic amine provides excellent long-term stability of the ink. Thus, alkanolamines are preferable. Since clogging can be prevented by using an alkanolamine with a high boiling point, trialkanolamines are more preferable. In particular, at least one of tripropanolamine and triethanolamine is more preferably used.

The amine has a drawback in that it easily forms a precipitate together with the unsaturated fatty acid. That is, using the amine alone as the alkali results in poor stability. Thus, the alkalis used in the invention include both the amine and the alkali metal hydroxide described later.

The amines may be used singly, or two or more may be used in combination.

The content of the amine is preferably 0.05 to 2% by mass, and more preferably 0.1 to 1% by mass with respect to the total mass (100% by mass) of the pigment ink. This content ensures that the amine produces excellent synergistic effects with the alkali metal hydroxide.

Alkali Metal Hydroxides

The pigment ink in this embodiment contains an alkali metal hydroxide.

The alkali metal hydroxide, which is one of the four pH adjusters in the invention, is a good alkali. However, the metal ions are easily captured by an organic solvent or the pigment to form a complex product, thereby deteriorating long-term stability. The alkali metal ions are less likely to form precipitates with the unsaturated fatty acids than the amines. Thus, the amine and the alkali metal hydroxide used in combination complement each other to compensate for their respective shortcomings and exhibit their advantageous characteristics.

The alkali metal hydroxide is preferably at least one selected from sodium hydroxide (NaOH), potassium hydroxide (KOH) and lithium hydroxide (LiOH). More preferably, at least one of NaOH and KOH is used.

The alkali metal hydroxides may be used singly, or two or more may be used in combination.

The content of the alkali metal hydroxide is preferably 0.01 to 1% by mass, and more preferably 0.03 to 0.5% by mass with respect to the total mass (100% by mass) of the pigment ink. This content ensures that the alkali metal hydroxide produces excellent synergistic effects with the amine.

The unsaturated fatty acid, the amino acid, the alkali metal hydroxide and the amine may be contained in the ink as individual substances or as acid-base salts. In particular, higher pH buffer effects are obtained when the pigment ink contains an acid-base salt formed between at least one of the unsaturated fatty acid and the amino acid and at least one of the alkali metal hydroxide and the amine. Examples of the acid-base salts include but are not limited to potassium oleate, sodium oleate, lithium oleate, tripropanolamine oleate, triethanolamine oleate, amino acid potassium salt, amino acid sodium salt and amino acid lithium salt.

Of these, one or more selected from potassium oleate, tripropanolamine oleate, triethanolamine oleate and amino acid potassium salt are preferably used. These preferred salts have high solubility in the ink and excellent pH adjusting functions and do not adversely affect the pigment and other ink materials.

Other Additives

The pigment ink in this embodiment may contain additives in addition to the aforementioned additives. Exemplary additives are described below.

Wetting Agents

In order to prevent clogging in the vicinity of nozzles of an ink jet head, the pigment ink in this embodiment preferably contains a water-soluble organic solvent having wetting effects.

Examples of the wetting agents include polyhydric alcohols such as glycerol, 1,2,6-hexanetriol, trimethylolpropane, pentamethylene glycol, trimethylene glycol, ethylene glycol, propylene glycol, diethylene glycol, triethylene glycol, tetraethylene glycol, pentaethylene glycol, polyethylene glycol having a number average molecular weight of not more than 2000, dipropylene glycol, tripropylene glycol, isobutylene glycol, 2-butene-1,4-diol, 2-ethyl-1,3-hexanediol, 2-methyl-2,4-pentanediol, meso-erythritol and pentaerythritol; solid wetting agents, including saccharides, sugar alcohols, hyaluronic acids and urea compounds such as glucose, mannose, fructose, ribose, xylose, arabinose, galactose, aldonic acid, glucitol (sorbitol), maltose, cellobiose, lactose, sucrose, trehalose and maltotriose; alkyl alcohols having 1 to 4 carbon atoms such as ethanol, methanol, butanol, propanol and isopropanol; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin and sulfolane.

The wetting agents may be used singly, or two or more may be used in combination.

The content of the wetting agent is preferably 10 to 50% by mass with respect to the total mass (100% by mass) of the pigment ink. This content ensures appropriate property values (such as viscosity) of the pigment ink as well as high quality and reliability of the prints.

Water

The pigment ink in this embodiment may contain water as a main solvent. It is preferable to use pure water or ultrapure water such as ion exchanged water, ultrafiltration water, reverse osmosis purified water or distilled water. In particular, water that has been sterilized by ultraviolet irradiation or with hydrogen peroxide is preferably used, thereby inhibiting the growth of molds and bacteria and realizing long storage of the pigment ink.

Antioxidants

The pigment ink in this embodiment may contain an antioxidant (UV absorber). Examples thereof include allophanates such as allophanate and methyl allophanate; biurets such as biuret, dimethylbiuret and tetramethylbiuret; L-ascorbic acid and salts thereof; and lanthanide oxides. Commercial antioxidants include Tinuvin series 328, 900, 1130, 384, 292, 123, 144, 622, 770 and 292, Irgacor series 252 and 153, Irganox series 1010, 1076 and 1035, and MD 1024 (manufactured by Ciba-Geigy).

The antioxidants may be used singly, or two or more may be used in combination.

The content of the antioxidant is preferably not more than 0.5% by mass with respect to the total mass (100% by mass) of the pigment ink. This content ensures that oxidation is effectively prevented without deteriorating the characteristics of the ink.

Preservatives/Fungicides

The pigment ink in this embodiment may contain a preservative/fungicide. Examples thereof include sodium benzoate, pentachlorophenol sodium, 2-pyridinethiol-1-oxide sodium, sodium sorbate, sodium dehydroacetate, 1,2-dibenzisothiazolin-3-one, dichlorophene, hexachlorophene, p-hydroxybenzoate, ethylene diamine tetraacetic acid (EDTA), sodium dehydroacetate, 3,4-isothiazolin-3-one and 4,4-dimethyloxazolidine. Commercial products include Proxel CRL, Proxel BDN, Proxel GXL, Proxel XL-2 (1,2-benzisothiazolin-3-one) and Proxel TN (product names, manufactured by Avecia).

The preservatives/fungicides may be used singly, or two or more may be used in combination.

The content of the preservative/fungicide is preferably not more than 0.5% by mass with respect to the total mass (100% by mass) of the pigment ink. This content ensures that high preservative and anti-fungus effects are obtained without deteriorating the characteristics of the ink.

Penetration Enhancing Agents

The pigment ink in this embodiment preferably contains a penetration enhancing agent to facilitate for the aqueous solvent to penetrate into a recording medium. Quick penetration of the aqueous solvent into a recording medium reduces the bleeding of the printed image.

Preferably, at least one of a polyhydric alcohol alkyl ether (also referred to as glycol ether) and a 1,2-alkyl diol is used as the penetration enhancer. Examples of the polyhydric alcohol alkyl ethers include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol monopropyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol monopropyl ether, propylene glycol monoisopropyl ether, dipropylene glycol monomethyl ether, dipropylene glycol monoethyl ether, dipropylene glycol monopropyl ether, dipropylene glycol monoisopropyl ether, propylene glycol monobutyl ether and dipropylene glycol monobutyl ether. Examples of the 1,2-alkyl diols include 1,2-pentanediol and 1,2-hexanediol. Examples further include linear hydrocarbon diols such as 1,3-propanediol, 1,4-butanediol, 1,5-pentanediol, 1,6-hexanediol, 1,7-heptanediol and 1,8-octanediol.

The penetration enhancing agents may be used singly, or two or more may be used in combination.

The content of the penetration enhancing agent is preferably 3 to 20% by mass with respect to the total mass (100% by mass) of the pigment ink. This content ensures that the pigment ink shows excellent penetration properties into a recording medium and can record images without bleeding, and that an excessively high viscosity of the pigment ink is avoided.

As described hereinabove, the pigment ink according to this embodiment can suppress satellite droplets and can produce high quality images at high speed. In detail, the composition of the ink according to the above embodiment includes a combination of the acetylene glycol or 2-ethyl-1,3-hexanediol and the unsaturated fatty acid as the surfactants, as well as a combination of the unsaturated fatty acid, the amino acid, the amine and the alkali metal hydroxide as the pH adjusters to remedy the problems that are encountered in the use of the surfactants. These combinations allow the pigment ink to be ejected without satellite droplet formation even in high speed recording and to show excellent long-term stability.

Ink Jet Recording Apparatuses

Hereinbelow, an ink jet recording apparatus according to an embodiment of the invention will be described with reference to the accompanying drawings, in which the size of the members has been modified appropriately so that all the members are visible. In this embodiment, an ink jet printer (hereinafter, simply referred to as "printer") will be described as an exemplary ink jet recording apparatus of the invention.

FIG. 1 is a perspective view illustrating a structure of a printer 1 in this embodiment. The printer 1 is a serial printer.

As illustrated in FIG. 1, the printer 1 has a carriage 4 on which an ink jet head 2 is mounted and ink cartridges 3 are detachably installed, a platen 5 which is provided under the ink jet head 2 and on which a recording medium 6 is transported, a carriage moving mechanism 7 which moves the carriage 4 in the medium width direction of the recording medium 6, and a medium transporting mechanism 8 which transports the recording medium 6 in the medium transporting direction. In addition, the printer 1 has a controller (CONT) that controls all the operations of the printer 1. Herein, the medium width direction is the main scanning direction (the head scanning direction), and the medium transporting direction is the sub scanning direction (the direction perpendicular to the main scanning direction).

The ink cartridges 3 are not limited to those that are installed in the carriage 4 as in this embodiment. In another embodiment, the ink cartridges may be fitted on the chassis of the printer 1 to supply the inks to the ink jet head 2 through ink supply tubes. The ink cartridges 3 contain different color inks such as yellow (Y), magenta (M), cyan (C) and black (Bk).

The carriage 4 is supported by a guide rod 9 that is a support member bridged in the main scanning direction. The carriage 4 can be moved by the carriage moving mechanism 7 in the main scanning direction along the guide rod 9.

A linear encoder 10 detects a signal indicating the position of the carriage 4 on the main scanning direction. The detected signal is transmitted as position information to the controller (CONT). The controller (CONT) recognizes the scanning position of the ink jet head 2 based on the position information from the linear encoder 10, and controls operations such as the recording (ejecting) operation of the ink jet head 2. The controller (CONT) is configured to variably control the moving speed of the carriage 4.

Figure 2:
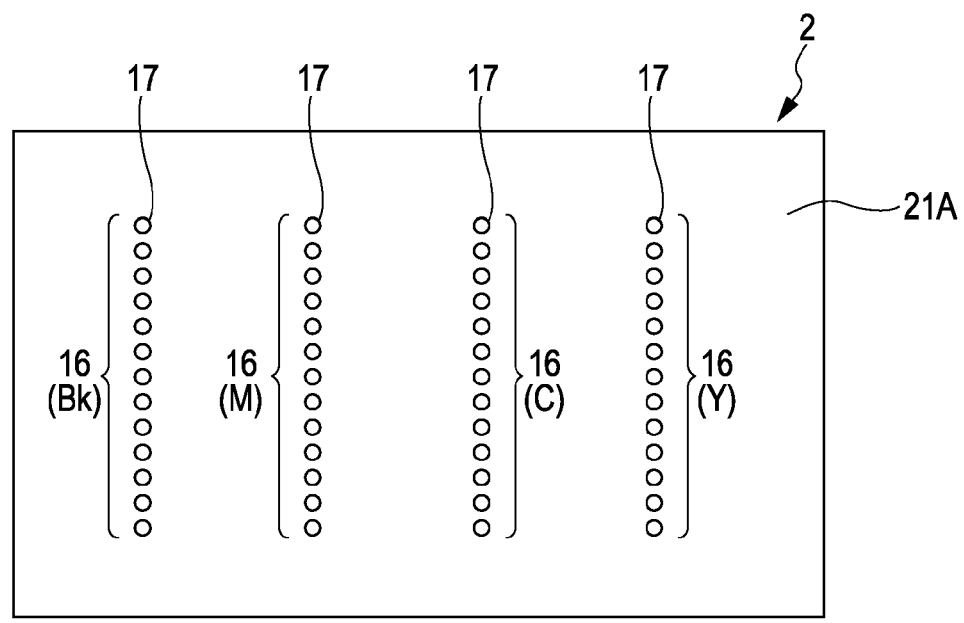
FIG. 2 is a schematic view illustrating an arrangement of nozzles that are provided in an ink jet head according to an embodiment of the invention.

FIG. 2 is a schematic view illustrating an arrangement of nozzles 17 that are provided in the ink jet head 2 according to this embodiment.

As illustrated in FIG. 2, the ink jet head 2 has a nozzle-forming surface 21A in which a plurality of nozzles 17 for ejecting the ink are provided. In the nozzle-forming surface 21A which is also an ink-ejecting surface, the plurality of nozzles 17 forms nozzle lines 16. For example, the nozzle lines 16 are configured to eject different color inks from one another. In this embodiment, four nozzle lines are provided corresponding to the colors of the inks, namely the nozzle line (black) 16 (Bk), the nozzle line (magenta) 16 (M), the nozzle line (cyan) 16 (C) and the nozzle line (yellow) 16 (Y). Each nozzle line 16 consists of, for example, one hundred eighty (180) nozzles 17.

Figure 3:
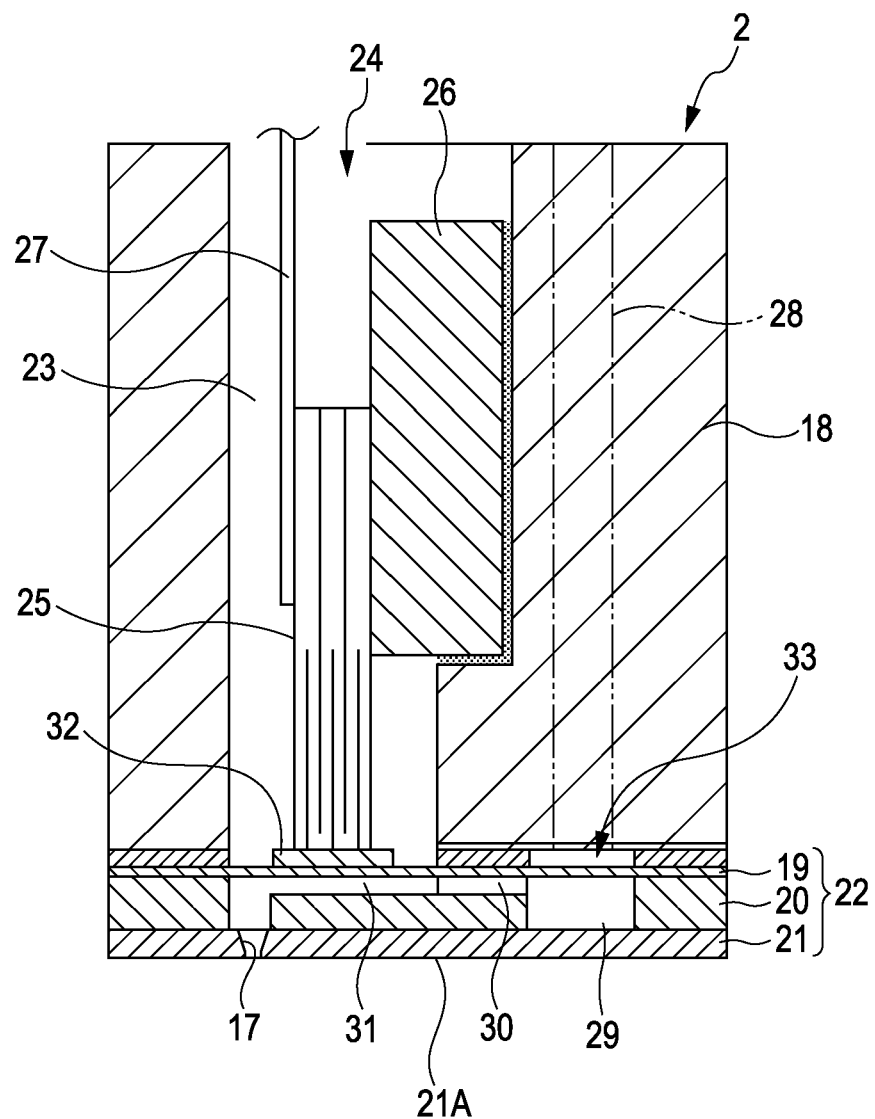
FIG. 3 is a partial sectional view illustrating an inside structure of an ink jet head according to an embodiment of the invention.

FIG. 3 is a partial sectional view illustrating an inside structure of the ink jet head 2 according to this embodiment.

As illustrated in FIG. 3, the ink jet head 2 has a head body 18 and a flow channel-forming unit 22 connected with the head body 18. The flow channel-forming unit 22 has a diaphragm 19, a flow channel substrate 20 and a nozzle substrate 21, and forms a common ink chamber 29, an ink supply port 30 and a pressure chamber 31. Further, the flow channel-forming unit 22 has an island portion 32 that functions as a diaphragm portion, and a compliance portion 33 that absorbs pressure variations in the common ink chamber 29. The head body 18 forms an accommodation space 23 in which a fixed member 26 and a driving unit 24 are accommodated, and an inner flow channel 28 which guides the ink to the flow channel-forming unit 22.

According to the ink jet head 2 having the above configuration, namely the piezoelectric ink jet head 2, a piezoelectric element 25 is stretched and contracted when a driving signal is input to the driving unit 24 through a cable 27. Consequently, the diaphragm 19 is deformed (moved) in the directions toward and away from the pressure chamber 31 to change the volume of the pressure chamber 31, resulting in variations of the pressure in the pressure chamber 31 containing the ink. The pressure variations cause the ink to be ejected from the nozzles 17.

Referring back to FIG. 1, the moving range of the ink jet head 2 includes a home position which is outside the platen 5 and is the starting point of the scanning of the ink jet head 2. A maintenance unit 11 is provided in the home position. The maintenance unit 11 is configured to perform a moisture retention operation in which the ink jet head 2 is capped with a cap member 12 except when recording is carried out to prevent the evaporation of the ink; a flushing operation in which the ink is preliminarily ejected from the nozzles 17 of the ink jet head 2 to the cap member 12 in order to prevent the clogging of the nozzles 17 by the portion of the ink which has increased the viscosity or in order to adjust the meniscus in the nozzles 17 so that the ink can be ejected normally from the ink jet head 2; a suction operation (head cleaning) in which after the ink jet head 2 is capped with the cap member 12, a suction pump not shown is driven to forcibly suction through the nozzles 17 the portion of the ink which has increased the viscosity as well as attached dusts and the like, thereby adjusting the meniscus and ensuring that the ink will be ejected normally from the ink jet head 2; and a wiping operation in which the nozzle-forming surface 21A (see FIG. 2) of the ink jet head 2 is wiped with a wiping member 13 to remove the ink which has attached near the nozzles 17 and the portion of the ink which has increased the viscosity, as well as to destroy the meniscus in the nozzles 17 and readjust the meniscus (a purge treatment).

The printer 1 in this embodiment is configured such that the ink jet head 2 ejects the pigment ink described in the aforementioned embodiment while moving at a relative speed of not less than 0.5 m/s relative to the recording medium 6, thus suppressing satellite droplet formation. In the case of the ink jet head 2 of this serial printer, the relative speed corresponds to the moving speed of the carriage 4 in the main scanning direction.

Instead of the serial printer described in this embodiment, the printer 1 may be a line printer having the fixed head. In the case of the line printer, the relative speed corresponds to the moving speed of the recording medium in the sub scanning direction.

The configuration in this embodiment is more effective in preventing satellite droplet formation as the printer performs printing at a higher speed and the consequent influences (satellite droplet formation) are more profound. In detail, greater effects in satellite inhibition may be obtained when the relative speed is 0.8 m/s or above.

In order to achieve good flying stability of the ink droplets, the ejection speed of the ink in the ink jet system is preferably 4 to 15 m/s. When the ejection speed is 4 m/s or above, the ink can be attached (land) on the recording medium with high accuracy. When the ejection speed is 15 m/s or less, the formation of satellite droplets can be suppressed effectively.

The influence of the satellite droplets will be described from the viewpoints of the relative speed and the tail length. For example, when an ink droplet with a tail length of 400 μm is ejected at a speed of 7 m/s, the main droplet and the satellite droplet will land with a time lag of about 60 μsec. Provided that the relative speed is 0.5 m/s, the placement error of the satellite droplet from the main droplet will be 30 μm based on the above time lag. Similarly, the placement error between the main droplet and the satellite droplet will be 60 μm at a relative speed of 1.0 m/s.

The drop placement error is influential to the quality of the printed images. The human eye sensitivity for prints allegedly detects a displacement error of 60 μm or more when the distance between the printed paper and the eyes is 30 cm. Accordingly, the landing misplacement between the main droplet and the satellite droplet is preferably within 60 μm, and more preferably within 30 μm.

When the relative speed is constant, the tail length is the factor that influences the placement error between the main droplet and the satellite droplet.

Accordingly, the ink is preferably such that the tail length is less than 400 μm. By configuring the ink such that the tail length is less than 400 μm, the formation of satellite droplets is effectively prevented.

The printer 1 in this embodiment involves the ink containing the unsaturated fatty acid as described hereinabove. Thus, the ink jet head is preferably a piezoelectric type which is less likely to cause the thermal oxidation of the unsaturated fatty acid. A thermal ink jet head may be used when the amount of the added unsaturated fatty acid is small. However, it is still preferable to use a piezoelectric type which is less likely to cause the clogging of the nozzles by the oxidation of the unsaturated fatty acid.

As described hereinabove, the ink jet recording apparatus according to this embodiment can suppress satellite droplet formation and can produce high quality images at high speed.

Ink Jet Recording Methods

An ink jet recording method according to an embodiment of the invention includes ejecting the pigment ink described in the aforementioned embodiment from the ink jet head 2 which moves at a relative speed of not less than 0.5 m/s relative to the recording medium 6, as described in the above embodiment of the ink jet recording apparatus.

Thus, the ink jet recording method according to this embodiment can suppress satellite droplet formation and can produce high quality images at high speed.

EXAMPLES

The embodiments of the invention will be described in greater detail by presenting examples and comparative examples hereinbelow without limiting the scope of the invention.

Used Materials
Pigment Dispersions
 CAB-O-JET300 (product name, manufactured by Cabot Corporation, solid content 15%)
 BONJET BLACK CW-1 (product name, manufactured by ORIENT CHEMICAL INDUSTRIES CO., LTD., pigment content 20%)
Surfactants
 Olfine E1010 (product name, manufactured by Nissin Chemical Industry Co., Ltd., acetylene glycol)
 Surfynol 104 (product name, manufactured by Air Products and Chemicals. Inc., acetylene glycol)
 2-Ethyl-1,3-hexanediol
 Triton X-100 (product name, manufactured by Roche Applied Science, $C_{14}H_{22}O(C_2H_4O)_n$, a nonionic linear surfactant)
Surfactants and pH Adjusters
 Oleic acid (manufactured by Tokyo Chemical Industry Co., Ltd., monounsaturated fatty acid)
 Linoleic acid (manufactured by Tokyo Chemical Industry Co., Ltd., diunsaturated fatty acid)
 Stearic acid (manufactured by Tokyo Chemical Industry Co., Ltd., saturated fatty acid)
pH Adjusters
 Trimethylglycine (anhydrous betaine, manufactured by Tokyo Chemical Industry Co., Ltd.)
 Dimethylglycine (N,N-dimethylglycine, manufactured by Tokyo Chemical Industry Co., Ltd.)
 Tripropanolamine (triisopropanolamine, manufactured by Tokyo Chemical Industry Co., Ltd.)
 Triethanolamine (manufactured by Tokyo Chemical Industry Co., Ltd.)
 Potassium hydroxide (manufactured by KANTO CHEMICAL CO., LTD.)
 Sodium hydroxide (manufactured by KANTO CHEMICAL CO., LTD.)
Penetration Enhancing Agents
 1,2-Hexanediol
 Triethylene glycol monobutyl ether (abbreviated to TEGmBE in TABLE 1)
Wetting Agents
 Glycerol
 Trimethylolpropane
Preservatives/Fungicides
 Disodium ethylene diamine tetraacetate (EDTA)
 Proxel XL-2
Preparation of Pigment Inks The components were mixed according to the formulations shown in TABLES 1 and 2. The mixtures were stirred at room temperature for 2 hours and were filtered through a membrane filter having a pore diameter of 5 μm. Thus, aqueous pigment inks were prepared in Examples 1 to 10 and Comparative Examples 1 to 20.

The contents shown in TABLES 1 and 2 are in % by mass. The content of the pigment dispersant is in terms of the solid concentration. The blanks indicate that the components were not added. The term "balance (Bal.)" for ion exchanged water means that ion exchanged water was added so that the total ink amount would be 100% by mass.

TABLE 1

| Ink composition | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| Pigments | CAB-O-JET300 | 6 | | 6 | 6 | | 6 | 6 | |
|  | Microjet CW1 | | 6 | | | 6 | | | 6 |
| Surfactants | Olfin E1010 | 0.3 | | 0.3 | | | 0.3 | 0.3 | |
|  | Surfynol 104 | | 0.1 | | 0.1 | 0.1 | | | |
|  | Triton X-100 | | | | | | | | |
| Surfactants, pH adjusters (acids) | Oleic acid | 0.2 | 0.2 | 0.2 | | 0.2 | | | 0.2 |
|  | Linoleic acid | | | | 0.2 | | | | |
|  | Stearic acid | | | | | | | 0.2 | |
| pH adjusters (amino acids) | Trimethylglycine | 5 | | 5 | 5 | 5 | 5 | 5 | 5 |
|  | Dimethylglycine | | 5 | | | | | | |
| pH adjusters (amines) | Tripropanolamine | 0.2 | | 0.2 | 0.2 | 0.2 | 0.2 | 0.2 | |
|  | Triethanolamine | | 0.2 | | | | | | 0.2 |
| pH adjusters (alkali metal hydroxides) | Potassium hydroxide | 0.1 | 0.1 | | | 0.1 | 0.1 | 0.1 | 0.1 |
|  | Sodium hydroxide | | | 0.1 | 0.1 | | | | |
| Penetration enhancers | 1,2-Hexanediol | 3 | 3 | 3 | 3 | 3 | 3 | 3 | 3 |
|  | TEGmBE | 2 | 2 | 2 | 2 | 2 | 2 | 2 | 2 |
| Wetting agents | Glycerol | 10 | 10 | 10 | 10 | 10 | 10 | 10 | 10 |
|  | Trimethylol propane | 2 | 2 | 2 | 2 | 2 | 2 | 2 | 2 |
| Preservatives/ fungicides | EDTA | 0.02 | 0.02 | 0.02 | 0.02 | 0.02 | 0.02 | 0.02 | 0.02 |
|  | Proxel XL-2 | 0.3 | 0.3 | 0.3 | 0.3 | 0.3 | 0.3 | 0.3 | 0.3 |
| Water | Ion exchanged water | Bal. | Bal. | Bal. | Bal. | Bal. | Bal. | Bal. | Bal. |
| Total | | 100 | 100 | 100 | 100 | 100 | 100 | 100 | 100 |

TABLE 1-continued

| Ink composition | | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|
| Pigments | CAB-O-JET300 | | 6 | | 6 | | 6 | |
|  | Microjet CW1 | 6 | | 6 | | 6 | | 6 |
| Surfactants | Olfin E1010 | | 0.3 | | 0.3 | | 0.3 | |
|  | Surfynol 104 | | | 0.3 | | 0.3 | | 0.3 |
|  | Triton X-100 | 0.2 | | | | | | |
| Surfactants, pH adjusters (acids) | Oleic acid | 0.2 | 0.2 | 0.2 | 0.2 | 0.2 | 0.2 | 0.2 |
|  | Linoleic acid | | | | | | | |
|  | Stearic acid | | | | | | | |
| pH adjusters (amino acids) | Trimethylglycine | 5 | | 5 | 5 | 5 | | |
|  | Dimethylglycine | | | | | | | |
| pH adjusters (amines) | Tripropanolamine | | 0.2 | | | | | 0.2 |
|  | Triethanolamine | 0.2 | | | 0.2 | | | |
| pH adjusters (alkali metal hydroxides) | Potassium hydroxide | 0.1 | 0.1 | | 0.1 | | 0.1 | |
|  | Sodium hydroxide | | | | | | | |
| Penetration enhancers | 1,2-Hexanediol | 3 | 3 | 3 | 3 | 3 | 3 | 3 |
|  | TEGmBE | 2 | 2 | 2 | 2 | 2 | 2 | 2 |
| Wetting agents | Glycerol | 10 | 10 | 10 | 10 | 10 | 10 | 10 |
|  | Trimethylol propane | 2 | 2 | 2 | 2 | 2 | 2 | 2 |
| Preservatives/ fungicides | EDTA | 0.02 | 0.02 | 0.02 | 0.02 | 0.02 | 0.02 | 0.02 |
|  | Proxel XL-2 | 0.3 | 0.3 | 0.3 | 0.3 | 0.3 | 0.3 | 0.3 |
| Water | Ion exchanged water | Bal. | Bal. | Bal. | Bal. | Bal. | Bal. | Bal. |
| | Total | 100 | 100 | 100 | 100 | 100 | 100 | 100 |

TABLE 2

| Ink composition | | Ex. 6 | Ex. 7 | Ex. 8 | Ex. 9 | Ex. 10 | Comp. Ex. 11 | Comp. Ex. 12 | Comp. Ex. 13 |
|---|---|---|---|---|---|---|---|---|---|
| Pigments | CAB-O-JET300 | 6 | | 6 | 6 | | 6 | 6 | |
|  | BONJET BLACK CW-1 | | 6 | | | 6 | | | 6 |
| Surfactants | 2-Ethyl-1,3-hexanediol | 1 | 0.5 | 2 | 1 | 1 | 1 | 1 | |
|  | Triton X-100 | | | | | | | | |
| Surfactants, pH adjusters (acids) | Oleic acid | 0.2 | 0.2 | 0.2 | | 0.2 | | | 0.2 |
|  | Linoleic acid | | | | 0.2 | | | | |
|  | Stearic acid | | | | | | | 0.2 | |
| pH adjusters (amino acids) | Trimethylglycine | 5 | | 5 | 5 | 5 | 5 | 5 | 5 |
|  | Dimethylglycine | | 5 | | | | | | |
| pH adjusters (amines) | Tripropanolamine | 0.2 | | 0.2 | 0.2 | 0.2 | 0.2 | 0.2 | |
|  | Triethanolamine | | 0.2 | | | | | | 0.2 |
| pH adjusters (alkali metal hydroxides) | Potassium hydroxide | 0.1 | 0.1 | | | 0.1 | 0.1 | 0.1 | 0.1 |
|  | Sodium hydroxide | | | 0.1 | 0.1 | | | | |
| Penetration enhancers | 1,2-Hexanediol | 3 | 3 | 3 | 3 | 3 | 3 | 3 | 3 |
|  | TEGmBE | 2 | 2 | 2 | 2 | 2 | 2 | 2 | 2 |
| Wetting agents | Glycerol | 10 | 10 | 10 | 10 | 10 | 10 | 10 | 10 |
|  | Trimethylol propane | 2 | 2 | 2 | 2 | 2 | 2 | 2 | 2 |
| Preservatives/ fungicides | EDTA | 0.02 | 0.02 | 0.02 | 0.02 | 0.02 | 0.02 | 0.02 | 0.02 |
|  | Proxel XL-2 | 0.3 | 0.3 | 0.3 | 0.3 | 0.3 | 0.3 | 0.3 | 0.3 |
| Water | Ion exchanged water | Bal. | Bal. | Bal. | Bal. | Bal. | Bal. | Bal. | Bal. |
| | Total | 100 | 100 | 100 | 100 | 100 | 100 | 100 | 100 |

| Ink composition | | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Pigments | CAB-O-JET300 | | 6 | | 6 | | 6 | |
|  | BONJET BLACK CW-1 | 6 | | 6 | | 6 | | 6 |
| Surfactants | 2-Ethyl-1,3-hexanediol | | 1 | 1 | 1 | 1 | 1 | 1 |
|  | Triton X-100 | 0.2 | | | | | | |
| Surfactants, pH adjusters (acids) | Oleic acid | 0.2 | 0.2 | 0.2 | 0.2 | 0.2 | 0.2 | 0.2 |
|  | Linoleic acid | | | | | | | |
|  | Stearic acid | | | | | | | |
| pH adjusters (amino acids) | Trimethylglycine | 5 | | 5 | 5 | 5 | | |
|  | Dimethylglycine | | | | | | | |
| pH adjusters (amines) | Tripropanolamine | | 0.2 | | | | | 0.2 |
|  | Triethanolamine | 0.2 | | | 0.2 | | | |

TABLE 2-continued

| | | | | | | | | |
|---|---|---|---|---|---|---|---|---|
| pH adjusters (alkali metal hydroxides) | Potassium hydroxide Sodium hydroxide | 0.1 | 0.1 | | 0.1 | | 0.1 | |
| Penetration enhancers | 1,2-Hexanediol | 3 | 3 | 3 | 3 | 3 | 3 | 3 |
| | TEGmBE | 2 | 2 | 2 | 2 | 2 | 2 | 2 |
| Wetting agents | Glycerol | 10 | 10 | 10 | 10 | 10 | 10 | 10 |
| | Trimethylol propane | 2 | 2 | 2 | 2 | 2 | 2 | 2 |
| Preservatives/ fungicides | EDTA | 0.02 | 0.02 | 0.02 | 0.02 | 0.02 | 0.02 | 0.02 |
| | Proxel XL-2 | 0.3 | 0.3 | 0.3 | 0.3 | 0.3 | 0.3 | 0.3 |
| Water | Ion exchanged water | Bal. | Bal. | Bal. | Bal. | Bal. | Bal. | Bal. |
| | Total | 100 | 100 | 100 | 100 | 100 | 100 | 100 |

The pigment inks shown in TABLES 1 and 2 were evaluated as follows.

Evaluation of Tail Length

The pigment ink was loaded into a cartridge of ink jet printer PX-500 (product name, manufactured by Seiko Epson Corporation). The tail length of the ejected ink droplet was measured with ink jet ejection monitoring system Dot View (product name, manufactured by Tritek). The evaluation criteria were as follows. The results are described in TABLES 3 and 4.

○: The tail length was less than 400 μm.
x: The tail length was 400 μm or more.

Evaluation of Ink Bubbling

The pigment ink weighing 10 g was sealed in a cylindrical glass container 2 cm in diameter and 10 cm in height. The container was shaken 50 times. The height was measured from the interface between the bubbles (air foams) and the liquid to the maximum height (H) of the bubble phase. The evaluation criteria were as follows. The results are described in TABLES 3 and 4.

○: Less than 5 cm.
Δ: From 5 cm to less than 8 cm.
x: 8 cm or more.

Evaluation of Satellite Occurrence

The ink was loaded into an ink cartridge of printer PX-B500 (product name, manufactured by Seiko Epson Corporation), and the printer was turned on. Since the original head carriage speed of the printer PX-B500 was 1.1 m/sec, the printer had been modified so that the carriage speed was variable from 0.3 to 1.1 m/sec. The maximum carriage speed was set to the four levels, namely 0.3, 0.5, 0.7 and 0.9 m/sec, and the relationship between the printing speed at each of the maximum carriage speed and satellite droplet formation was examined. The prints recorded on superfine paper manufactured by Seiko Epson Corporation were observed with an optical microscope to examine the presence of satellite droplets.

Although satellite droplets are ideally completely absent, whether an ejected ink droplet is broken in the air is partly a matter of probability. Thus, it is difficult under any conditions that satellite droplets are completely absent. That is, satellite droplets are acceptable as long as they are not noticeable on the print. In other words, satellite droplets are acceptable as long as the satellite droplets are within less than 60 μm from the main droplets of the print. The human eye sensitivity for prints allegedly detects a displacement error of 60 μm or more when the distance between the printed paper and the eyes is 30 cm.

From the foregoing description, the following practical criteria were adopted in determining the presence or absence of satellite droplets. The results are described in TABLES 3 and 4.

⊙: Satellite droplets were completely absent. In detail, the distance between the main droplets and the satellite droplets of the print was 0 μm.
○: Satellite droplets were absent. (Satellite inhibitory effects were confirmed.) In detail, the distance between the main droplets and the satellite droplets of the print was less than 60 μm.
x: Satellite droplets were present. In detail, the distance between the main droplets and the satellite droplets of the print was 60 μm or more.

Evaluation of Long Term Stability of Inks

The pigment ink was loaded into an ink cartridge of printer PX-B500 (product name, manufactured by Seiko Epson Corporation). The ink was allowed to stand for 1 month, 6 months or 1 year. Thereafter, printing was performed at a carriage speed of 0.9 m/sec as described in the evaluation of satellite occurrence, thereby examining changes of satellite droplet formation. The evaluation criteria were similar to those in the evaluation of satellite occurrence. The results are described in TABLES 3 and 4.

TABLE 3

| Evaluation items | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|---|---|---|
| Tail length | | ○ | ○ | ○ | ○ | ○ | X | X | X | X | ○ | ○ | ○ | ○ | ○ | ○ |
| Ink bubbling | | ○ | ○ | ○ | ○ | ○ | Δ | Δ | X | X | ○ | ○ | ○ | ○ | ○ | ○ |
| Satellite droplets | Maximum carriage speed 0.3 m/s | ⊙ | ⊙ | ⊙ | ⊙ | ⊙ | ○ | X | ○ | ○ | ⊙ | ⊙ | ⊙ | ⊙ | ⊙ | ⊙ |
| | 0.5 m/s | ⊙ | ⊙ | ⊙ | ⊙ | ⊙ | X | X | X | X | ⊙ | ⊙ | ⊙ | ⊙ | ⊙ | ⊙ |
| | 0.7 m/s | ⊙ | ⊙ | ⊙ | ⊙ | ⊙ | X | X | X | X | ⊙ | ⊙ | ⊙ | ⊙ | ⊙ | ⊙ |
| | 0.9 m/s | ⊙ | ⊙ | ⊙ | ⊙ | ⊙ | X | X | X | X | ⊙ | ⊙ | ⊙ | ⊙ | ⊙ | ⊙ |
| Long term stability (satellite droplets at carriage speed of 0.9 m/s) | 1 month | ⊙ | ⊙ | ⊙ | ⊙ | ⊙ | X | X | X | X | ⊙ | ⊙ | ⊙ | X | ○ | ○ |
| | 6 months | ⊙ | ⊙ | ⊙ | ○ | ⊙ | X | X | X | X | ○ | ○ | ○ | X | X | X |
| | 1 year | ⊙ | ⊙ | ⊙ | ○ | ⊙ | X | X | X | X | X | X | X | X | X | X |

TABLE 4

| Evaluation items | | Ex. 6 | Ex. 7 | Ex. 8 | Ex. 9 | Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|---|---|---|---|---|---|---|---|
| Tail length | | ○ | ○ | ○ | ○ | ○ | X | X | X | X | ○ | ○ | ○ | ○ | ○ | ○ |
| Ink bubbling | | ○ | ○ | ○ | ○ | ○ | Δ | Δ | X | X | ○ | ○ | ○ | ○ | ○ | ○ |
| Satellite droplets | Maximum carriage speed 0.3 m/s | ◎ | ◎ | ◎ | ◎ | ◎ | ○ | X | ○ | ○ | ◎ | ◎ | ◎ | ◎ | ◎ | ◎ |
| | 0.5 m/s | ◎ | ◎ | ◎ | ◎ | ◎ | ○ | X | X | X | ◎ | ◎ | ◎ | ◎ | ◎ | ◎ |
| | 0.7 m/s | ◎ | ◎ | ◎ | ◎ | ◎ | X | X | X | X | ◎ | ◎ | ◎ | ◎ | ◎ | ◎ |
| | 0.9 m/s | ○ | ○ | ○ | ○ | ○ | X | X | X | X | ○ | ○ | ○ | ○ | ○ | ○ |
| Long term stability (satellite droplets at carriage speed of 0.9 m/s) | 1 month | ◎ | ◎ | ◎ | ◎ | ◎ | X | X | X | X | ◎ | ◎ | ◎ | X | ○ | ○ |
| | 6 months | ◎ | ◎ | ◎ | ○ | ◎ | X | X | X | X | ○ | ○ | ○ | X | X | X |
| | 1 year | ◎ | ◎ | ◎ | ○ | ◎ | X | X | X | X | X | X | X | X | X | X |

The results in TABLES 3 and 4 show that satellite droplets were suppressed with the inks of Examples 1-10 and Comparative Examples 5-10 and 15-20 which contained the acetylene glycol or 2-ethyl-1,3-hexanediol and the unsaturated fatty acid. The inks of Examples 1-10 which contained the four pH adjusters, namely the unsaturated fatty acid, the amino acid, the alkali metal hydroxide and the amine, were found to suppress satellite droplet formation stably over the long term.

What is claimed is:

1. An ink jet recording method comprising ejecting a pigment ink of using an ink jet head which ejects ink droplets moving at a relative speed of not less than 0.5 m/s relative to a recording medium, comprising:
   water, an acetylene glycol or 2-ethyl-1,3-hexanediol, and an unsaturated fatty acid, an amino acid, an alkali metal hydroxide. and an amine;
   wherein the content of the amine is 0.05% to 2% by mass with respect to a total mass of the pigment ink:
   wherein the unsaturated fatty acid includes oleic acid,
   wherein the amino acid includes at least one of trimethylglycine and dimeth thylglycine;
   wherein the alkali metal hydroxide includes one or more selected from the group consisting of potassium hydroxide (KOH), sodiumhydroxide (NaOH) and lithium hydroxide (LiOH):
   wherein the amine includes at least one of triethanolamine and tripropanolamine:
   the ink droplets ejection speed is 4 m/s to 15 m/s.

2. The ink jet recording method according to claim 1, wherein a tail length of the ejected ink droplet is less than 400 μm.

3. The ink jet recording method according to claim claim 1, wherein the landing displacement between a main droplet and a satellite droplet is within 60 μm.

4. The ink jet recording method according to claim claim 1, wherein the landing displacement between the main droplet and the satellite droplet is within 30 μm.

5. The ink jet recording method according to claim 1, wherein the content of the unsaturated fatty acid is 0.05% to 3% by mass with respect to the total mass of the pigment ink.

6. The ink jet recording method according to claim 1. wherein the content of the alkali metal hydroxide is 0.01% to 1% by mass with respect to the total mass of the pigment ink.

7. The ink jet recording method according to claim 1, which contains an acid-base salt formed between at least one of unsaturated fatty acid and amino acid, and at least one of the alkali metal hydroxide and amine.

8. The ink jet recording method according to claim 1, wherein the acid-base salt is one or more selected from the group consisting of potassium oleate, tripanolamine oleate, triethanolamine oleate and amino acid potassium salt.

9. The ink jet recording apparatus comprising an ink jet method according to claim 1.

* * * * *